(12) United States Patent
Shelandaer

(10) Patent No.: US 11,745,118 B1
(45) Date of Patent: Sep. 5, 2023

(54) MECHANICAL VAPOR RECOMPRESSION SOLVENT RECOVERY

(71) Applicant: Agustus Berman Shelandaer, Los Angeles, CA (US)

(72) Inventor: Agustus Berman Shelandaer, Los Angeles, CA (US)

(73) Assignee: Ace Machine Design LLC, Los Angeles, CA (US)

( * ) Notice: Subject to any disclaimer, the term of this patent is extended or adjusted under 35 U.S.C. 154(b) by 0 days.

(21) Appl. No.: 17/831,195

(22) Filed: Jun. 2, 2022

(51) Int. Cl.
*B01D 1/28* (2006.01)
*B01D 5/00* (2006.01)
*C02F 1/04* (2023.01)

(52) U.S. Cl.
CPC .............. *B01D 5/006* (2013.01); *B01D 1/28* (2013.01); *B01D 5/0015* (2013.01); *B01D 5/0039* (2013.01); *C02F 1/041* (2013.01)

(58) Field of Classification Search
CPC ........ B01D 1/28; B01D 5/006; B01D 5/0015; B01D 5/0039; C02F 1/041
See application file for complete search history.

(56) References Cited

U.S. PATENT DOCUMENTS

| | | | |
|---|---|---|---|
| 1,966,133 A | 7/1934 | Pieper | |
| 2,064,931 A | 12/1936 | Lysholm | |
| 2,251,066 A | 7/1941 | Persson et al. | |
| 2,441,361 A | 5/1948 | Kirgan | |
| 2,942,657 A | 6/1960 | Kleinschmdt | |
| 3,240,268 A | 3/1966 | Armes | |
| 3,423,293 A | 1/1969 | Holden | |
| 3,590,917 A | 7/1971 | Huber et al. | |
| 3,956,072 A * | 5/1976 | Huse | B01D 1/289 202/180 |
| 4,030,985 A * | 6/1977 | Barba | B01D 1/26 202/174 |
| 4,303,468 A | 12/1981 | Aguilharre et al. | |
| 4,530,737 A | 7/1985 | Ostman | |
| 5,327,958 A | 7/1994 | Machata et al. | |
| 5,575,889 A | 11/1996 | Rosenblad | |
| 5,587,054 A * | 12/1996 | Keith | B01D 3/14 202/202 |
| 5,772,850 A * | 6/1998 | Morris | B01D 1/12 159/24.2 |
| 5,968,321 A * | 10/1999 | Sears | B01D 3/42 203/1 |
| 6,365,005 B1 * | 4/2002 | Schleiffarth | B01D 3/42 159/901 |
| 7,597,784 B2 * | 10/2009 | Bednarek | B01D 1/28 203/40 |

(Continued)

*Primary Examiner* — Jonathan Miller
(74) *Attorney, Agent, or Firm* — Intellectual Property Venture Group; Raymond E. Roberts

(57) ABSTRACT

A distillation apparatus for removing a solvent from a feed solution and producing a concentrated solute with mechanical recompression of vapor. A pre-heating heat exchanger receives and heats the feed solution from a previously produced intermediate instance of the vapor. A heat exchanger receives the feed solution from the pre-heating heat exchanger, to further heat the feed solution from heat in the vapor, and there from produce the vapor and the concentrated solute. A separator separates the vapor and the concentrated solute. And a compressor receives and compresses the vapor.

10 Claims, 3 Drawing Sheets

(56) References Cited

U.S. PATENT DOCUMENTS

| | | | |
|---|---|---|---|
| 8,366,883 B2 * | 2/2013 | Bednarek | B01D 1/2893 |
| | | | 417/297.5 |
| 8,550,153 B2 | 10/2013 | Yin et al. | |
| 10,441,895 B2 * | 10/2019 | Lord | B01D 5/006 |
| 10,765,963 B2 | 9/2020 | Bednarek et al. | |
| 10,807,883 B2 | 10/2020 | Kamen et al. | |
| 10,946,302 B2 | 3/2021 | Kamen et al. | |

* cited by examiner

MECHANICAL VAPOR RECOMPRESSION SOLVENT RECOVERY

CROSS-REFERENCE TO RELATED APPLICATIONS

This application claims the benefit of U.S. Provisional Application No. 63/196,377, filed Jun. 3, 2021, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Technical Field

The present invention relates generally to distillation separatory processes, and more particularly to such utilizing recovered heat for heating feed solutions.

Background Art

In traditional distillation, a liquid is heated directly from a heat source, such as an electric resistance element. This heat energy boils the liquid, and once in the gas phase it travels to a condensing section where it is cooled by dissipating heat to the environment, either directly or by an intermediate chilling system. Because most liquids have a "heat of vaporization" that requires a significant amount of energy to be turned from a liquid to a gas, and that heat energy is promptly dissipated to the environment to re-condense the gas, distillation in this manner is a very energy-intensive process.

The mechanical vapor recompression distillation process boils and condenses liquids for the purpose of purifying the boiled volatile components of a solution and/or concentrating any dissolved substances. This approach is desirable because enthalpy of evaporation used on the evaporation side is provided by enthalpy of condensation scavenged from the condensation side, with the end effect of significantly reduced energy input compared to a traditional distillation process.

Figure 1:
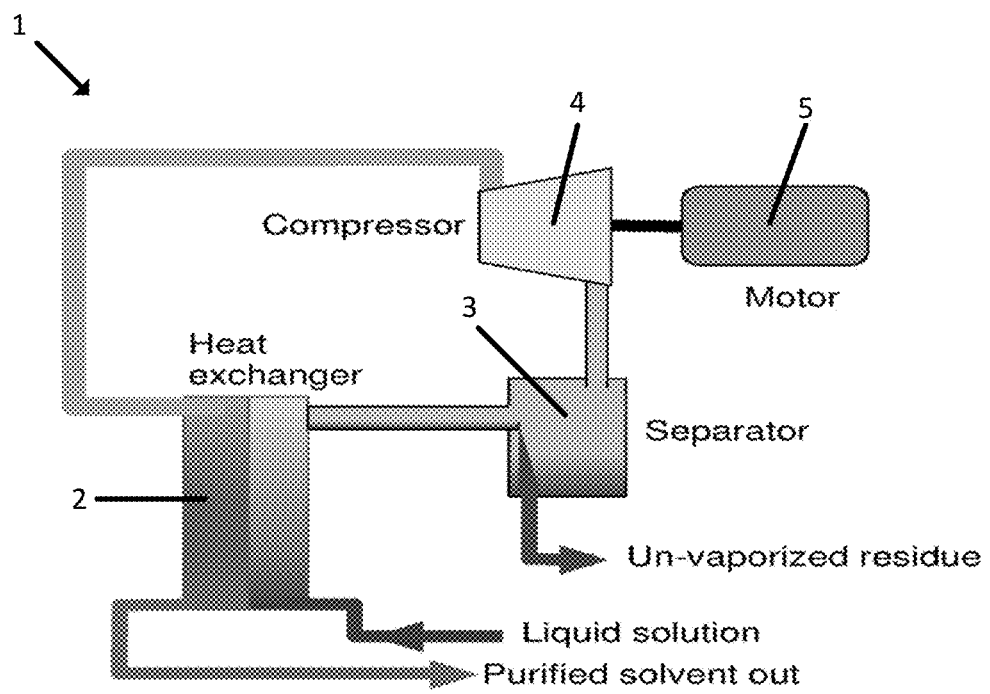

FIG. 1 (Prior Art) is a schematic diagram depicting a simplified mechanical vapor recompression system 1. A key element in this approach is a heat exchanger 2. A liquid solution to be distilled is input to the heat exchanger 2, where the volatile components boil into a gas that travels onward to a separator 3 and further onward to a compressor 4.

After exiting the heat exchanger 2, the vaporized gas is separated from the un-vaporized residue, and this residue will contain any higher boiling point compounds that may be contaminants that the process is trying to remove or products that need a solvent removed. The separator 3 may be a simple separation tank with a vapor port on top, a vortex separator, or any other means of separating a liquid and/or solid from a gas stream.

For distillation to occur, there must be a temperature differential across the heat exchanger 2. The compressor 4, therefore, compresses the evaporated gas, which increases its temperature. The compressed hot gas then flows to the heat exchanger 2, where it re-condenses by exchanging energy with the solution then entering the system. In the simplest arrangement, the only energy provided to this system may be a motive input (e.g., from a motor 5) to the compressor 4.

BRIEF SUMMARY OF THE INVENTION

Accordingly, it is an object of the present invention to provide process and apparatus for mechanical vapor recompression solvent recovery.

Briefly, one preferred embodiment of the present invention is a distillation apparatus for removing a solvent from a feed solution and producing a concentrated solute with mechanical recompression of vapor. A pre-heating heat exchanger receives and heats the feed solution from heat in a previously produced intermediate instance of the vapor. A heat exchanger receives the feed solution from the pre-heating heat exchanger, to further heat the feed solution from heat in the vapor, and there from produce the vapor and the concentrated solute. A separator then separates the vapor and the concentrated solute. And a compressor receives and compresses the vapor.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

Figure 2:
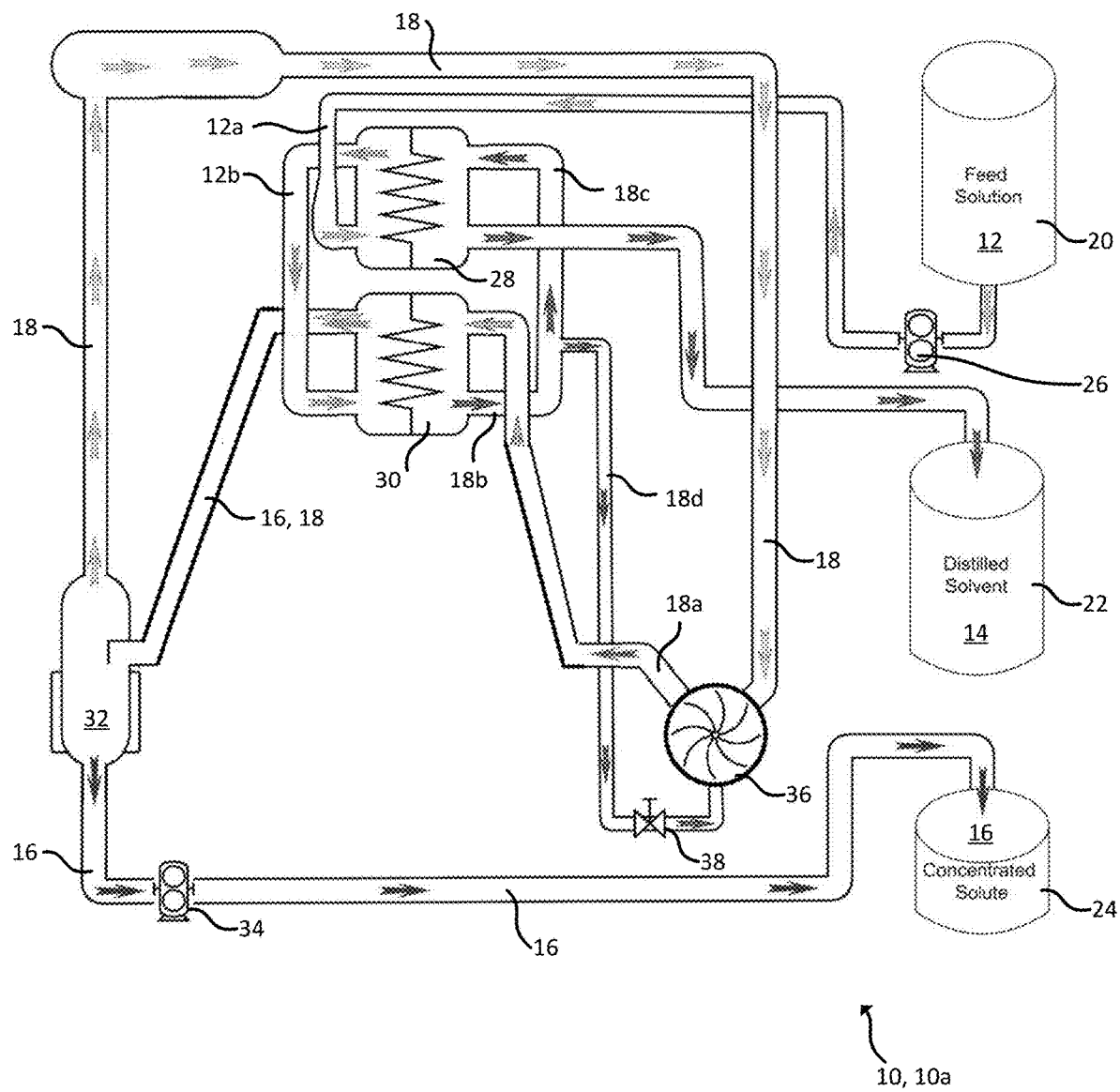
Figure 3:
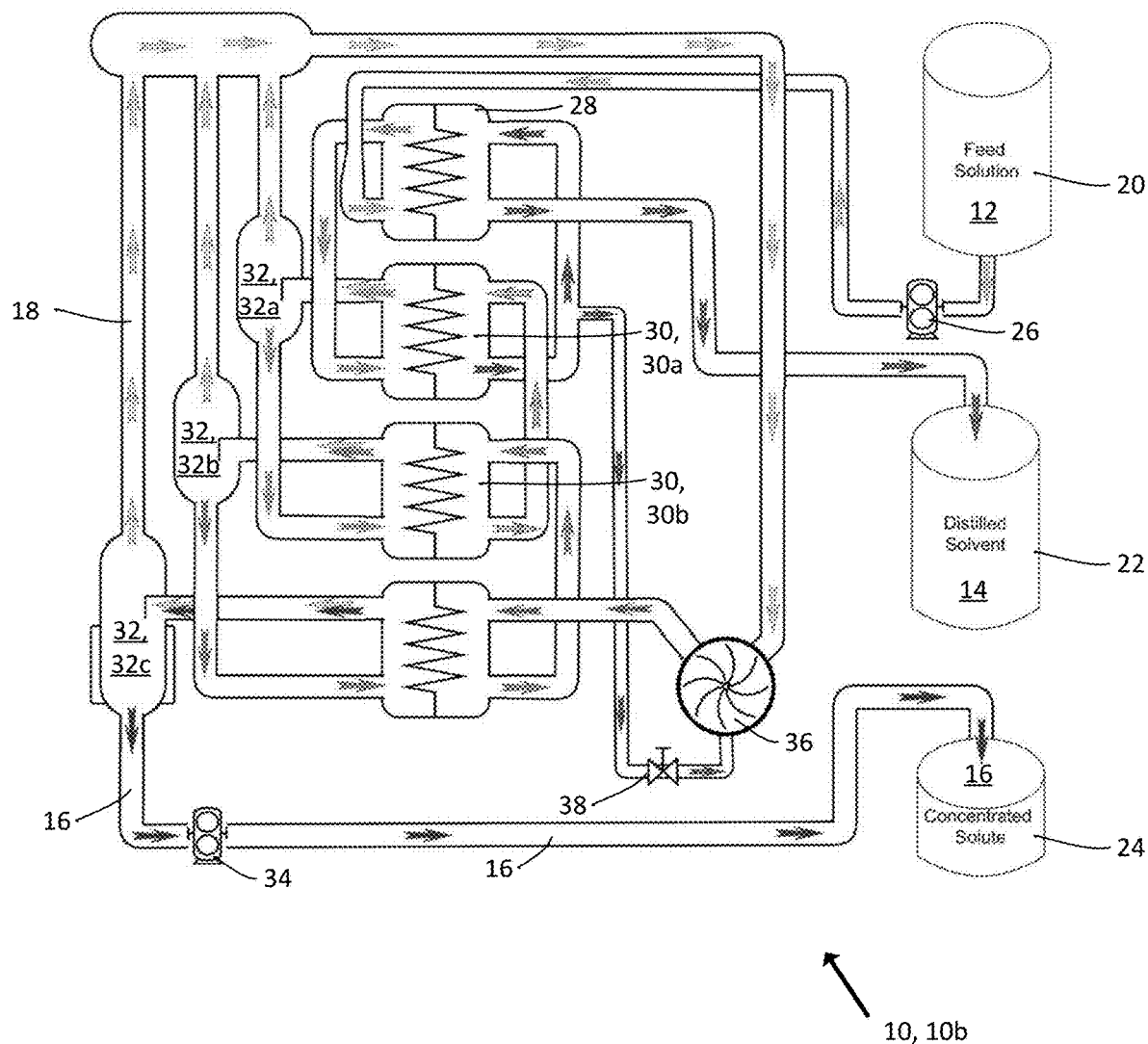

The purposes and advantages of the present invention will be apparent from the following detailed description in conjunction with the appended figures of drawings in which:

FIG. 1 (Prior Art) is a schematic diagram depicting a simplified mechanical vapor recompression system;

FIG. 2 schematically depicts a first embodiment of a mechanical vapor recompression (MVR) solvent recovery system in accord with the present invention; and FIG. 3 schematically depicts a second embodiment of a MVR solvent recovery system in accord with the present invention.

In the various figures of the drawings, like references are used to denote like or similar elements or steps.

DETAILED DESCRIPTION OF THE INVENTION

The present invention applies mechanical vapor recompression (MVR) to a feed solution to distill out a solvent and a solute in a natural product extraction or chemical synthesis process. Preferred embodiments of the present invention are process and apparatus for MVR as now described. As illustrated in the various drawings herein, and particularly in the views of FIGS. 2-3, preferred embodiments of the invention are depicted by the general reference character 10.

FIG. 2 schematically depicts a first embodiment of a distillation system in accord with the present invention. Generically this is termed a distillation system 10 and specifically the embodiment shown in FIG. 2 is a distillation system 10a.

The feed solution liquid 12 here is an input. It may be stored in a feed solution tank 20 (as shown) or it may be delivered directly from an earlier process. Ultimately, the distilled solvent liquid 14 is an output. It may be stored in a distilled solvent tank 22 (as also shown) or it may be delivered directly to a later process. Additionally, the concentrated solute liquid 16 is also an output. It may be stored in a concentrated solute tank 24 (as also shown) or it may also be delivered directly to a later process. More precisely, the distillation system 10a works on the feed solution liquid 12 to create an intermediate solvent vapor 18 that, in turn, becomes the distilled solvent liquid 14 and the concentrated solute liquid 16.

As shown in FIG. 2, a first pump 26, a pre-heating heat exchanger 28, a boiling heat exchanger 30, a separator 32, a second pump 34, a compressor 36, and a one-way valve 38 are employed in the distillation system 10a.

Employing the optional first pump 26 (e.g., gravity could be used as an alternate mechanism), the feed solution liquid 12 is delivered to the pre-heating heat exchanger 28 where the feed solution liquid 12 is warmed by outflowing distilled solvent liquid 14.

To facilitate clarity in FIG. 2, the feed solution liquid 12 is shown with simply reference 12 while in the feed solution tank 20, and with suffixed references 12a-b as it passes onward to become the concentrated solute liquid 16 and the intermediate solvent vapor 18.

The feed solution liquid 12a flows into the pre-heating heat exchanger 28, where it is heated and becomes the feed solution liquid 12b (as shown). From the pre-heating heat exchanger 28 the feed solution liquid 12b passes onward to a (first and here the only) boiling heat exchanger 30, where it is heated further and becomes a mixture of the concentrated solute liquid 16 and the intermediate solvent vapor 18.

The mixture of the concentrated solute liquid 16 and the intermediate solvent vapor 18 pass onward into a (first and here the only) separator 32 where the intermediate solvent vapor 18 is drawn off (depicted by an upward arrow) and passes onward. Concurrently, the concentrated solute liquid 16 also passes onward, as described presently.

To further facilitate clarity in FIG. 2, the intermediate solvent vapor 18 is shown with simply reference 18 before it enters a now to be described compressor 36 and with suffixed references 18a-d as it passes onward.

The intermediate solvent vapor 18 is drawn into the compressor 36 where it is firstly compressed as a first input and secondly mixed with a possible earlier produced second input portion (as presently described) to become the intermediate solvent vapor 18a (as shown). This increases the temperature of the intermediate solvent vapor 18a before it is sent into the boiling heat exchanger 30 where it is partially cooled (by transferring heat into the through-passing feed solution liquid 12b) and starts to condense, thus becoming the intermediate solvent vapor 18b (as shown).

The intermediate solvent vapor 18b is split into two portions. A majority portion becomes the intermediate solvent vapor 18c and a smaller portion becomes the intermediate solvent vapor 18d (as shown). The intermediate solvent vapor 18c is passed into the pre-heating heat exchanger 28 (where it transfers heat into the through-passing feed solution liquid 12a) and becomes the dissolved solvent liquid 14 that is output by the distillation system 10a. In contrast, the intermediate solvent vapor 18d travels, via the one-way valve 38, to become the earlier noted "second input portion" that enters the compressor 36 and is mixed there with newly arriving intermediate solvent vapor 18 to become the intermediate solvent vapor 18a.

Returning consideration briefly to the separator 32, it was earlier noted that as the intermediate solvent vapor 18 is drawn off the concentrated solute liquid 16 has also been produced and passes onward in the distillation system 10a. This is performed by the optional second pump 34 (e.g., gravity could here also be used as an alternate mechanism), which delivers the concentrated solute liquid 16 to the concentrated solute tank 24 (as shown).

FIG. 3 schematically depicts a second embodiment of a distillation system in accord with the present invention. Generically this is again termed a distillation system 10 and specifically the embodiment shown in FIG. 3 is a distillation system 10b.

Here as well, a feed solution liquid 12 is an input; a distilled solvent liquid 14 and a concentrated solute liquid 16 are outputs, and an intermediate solvent vapor 18 is present as a main intermediate. The feed solution liquid 12 may again be stored in a feed solution tank 20 or may be delivered directly from an earlier process. Similarly, the distilled solvent liquid 14 may be stored in a distilled solvent tank 22 or may be delivered directly to a later process. Yet similarly, the concentrated solute liquid 16 may be stored in a concentrated solute tank 24 or may also be delivered directly to a later process.

As shown in FIG. 3, an optional first pump 26, a pre-heating heat exchanger 28, a multitude of boiling heat exchangers 30 (specifically boiling heat exchangers 30a-c here), a multitude of separators 32 (specifically separators 32a-c here), an optional second pump 34, a compressor 36, and a one-way valve 38 are employed in the distillation system 10b.

Employing the optional first pump 26 (e.g., again, gravity could be used as an alternate feed mechanism) the feed solution liquid 12 is delivered to the pre-heating heat exchanger 28, where the feed solution liquid 12 is warmed by the outflowing distilled solvent liquid 14.

The feed solution liquid 12 then flows into the first boiling heat exchanger 30, 30a, where it is heated by a mixture of the distilled solvent liquid 14 and the intermediate solvent vapor 18. Here the feed solution liquid 12 starts to boil, releasing some of the intermediate solvent vapor 18. The feed solution liquid 12 and the intermediate solvent vapor 18 which are now present next flow to a first separator 32, 32a where the intermediate solvent vapor 18 is drawn off (depicted by an upward arrow) and the remaining feed solution liquid 12 (depicted by a downward arrow) flows onward.

The distillation system 10 may include as many boiling heat exchangers 30 and separators 32 as may be required or as desired to improve performance. Three boiling heat exchangers 30a-c and three separators 32a-c are shown in FIG. 3.

After the last separator 32c the concentrated solute liquid 16 is concentrated sufficiently and is discharged using an optional second pump 34 to the concentrated solute tank 24 (as shown; or elsewhere).

The intermediate solvent vapor 18 from all of the separators 32, 32a-c are collected together and drawn into the compressor 36, which compresses the solvent vapor 18 and in so doing increases the temperature of the intermediate solvent vapor 18, which is first sent to the last boiling heat exchanger 30c where the hot intermediate solvent vapor 18 is partially cooled and starts to condense, thereby providing the heat to drive boiling throughout the process. The remaining intermediate solvent vapor 18, in turn, passes through each remaining boiling heat exchanger 32*c-b* (in reverse order) until all of the intermediate solvent vapor 18 is liquified into the distilled solvent liquid 14, which exits the first boiling heat exchanger 30*a* onward to the distilled solvent tank 22 (as shown; or elsewhere).

Concurrently, some of the distilled solvent liquid 14 and is tapped off (here from the first boiling heat exchanger 30*a*) to provide liquid (via the one-way valve 38) to the compressor 36. In this manner, the remaining distilled solvent liquid 14 passes through the pre-heating heat exchanger 28, which removes any remaining useful heat in the remaining distilled solvent liquid 14 before it is ultimately discharged onward as already discussed above.

In the inventors presently preferred embodiment of the inventive distillation system 10, 10*a-b* the boiling heat exchangers 30, 30*a-c* are parallel plate heat exchangers to pre-heat the incoming feed liquid by means of the outflowing liquified the volatile component(s) in the described mechanical recompression of vapor distillation. The compressor 36 is preferably, but not necessarily, a liquid ring compressor (aka, a liquid ring pump).

The inventive distillation system 10, 10*a-b* is well suited for removing the solvent from a solution when it contains plant based oils and/or synthetic compounds. In such roles the feed solution liquid 12 can contain one or more (i.e., possibly a mixture) of ethanol, methanol, diethyl ether, propane, butane, pentane, hexane, a terpene, or a hydrofluorocarbon. This makes the inventive distillation system 10, 10*a-b* especially versatile and permits its use widely in modern industry. The concentrated solute can particularly contain a plant-based oil and/or at least one synthetic compound.

While various embodiments have been described above, it should be understood that they have been presented by way of example only, and that the breadth and scope of the invention should not be limited by any of the above described exemplary embodiments but should instead be defined only in accordance with the following claims and their equivalents.

What is claimed is:

1. A distillation apparatus for removing a solvent from a feed solution and producing a concentrated solute with mechanical recompression of a vapor, the distillation apparatus comprising:
   - a pre-heating heat exchanger to receive and heat the feed solution from heat in an intermediate vapor previously produced from the vapor;
   - a plurality of at least two series connected heat exchangers to receive the feed solution from said pre-heating heat exchanger, to further heat the feed solution from heat in a compressed vapor, and there from produce the vapor and the concentrated solute;
   - a plurality of separators like in quantity to said plurality heat exchangers to separate the vapor and the concentrated solute produced in said plurality of said heat exchangers; and
   - a compressor to receive the vapor from said plurality of said separators and compress the vapor to produce said compressed vapor.

2. The distillation apparatus of claim 1 where the solvent contains a member of the set consisting of ethanol, methanol, diethyl ether, propane, butane, pentane, hexane, a terpene, and a hydrofluorocarbon.

3. The distillation apparatus of claim 1 wherein the concentrated solute contains a plant-based oil.

4. The distillation apparatus of claim 1 wherein the concentrated solute contains at least one synthetic compound.

5. The distillation apparatus of claim 1 further comprising a feed means to deliver the feed solution into the distillation apparatus.

6. The distillation apparatus of claim 1 further comprising an extraction means to deliver the concentrated solute out of the distillation apparatus.

7. The distillation apparatus of claim 1 wherein said compressor is a liquid ring type compressor.

8. The distillation apparatus of claim 1 wherein said plate heat exchanger is a parallel plate type heat exchanger.

9. The distillation apparatus of claim 1 wherein said plurality of said heat exchangers is three said heat exchangers and said like plurality of said separators is three said separators.

10. The distillation apparatus of claim 1 wherein said compressor is a single said compressor that receives and compress the vapor from said plurality of said separators and compresses the vapor to produce said compressed vapor that passes through said plurality of heat exchangers.

* * * * *